(12) United States Patent
Ekern et al.

(10) Patent No.: US 6,629,724 B2
(45) Date of Patent: Oct. 7, 2003

(54) VENTILATED SEAT

(75) Inventors: David F. Ekern, Plymouth, MI (US); Ronald G. Bedro, Plymouth, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/755,506

(22) Filed: Jan. 5, 2001

(65) Prior Publication Data

US 2002/0140258 A1 Oct. 3, 2002

(51) Int. Cl.[7] .................................................. A47C 7/74
(52) U.S. Cl. ............................ 297/180.11; 297/180.14; 297/452.46; 297/452.47; 297/452.43
(58) Field of Search ..................... 297/180.4, 180.13, 297/180.14, 452.46, 452.47, 452.42, 452.43

(56) References Cited

U.S. PATENT DOCUMENTS

| | | |
|---|---|---|
| 374,424 A | 12/1887 | Ober |
| 390,154 A | 9/1888 | Beach |
| 1,370,832 A | 3/1921 | Mollberg |
| 1,439,681 A | 12/1922 | Alkire |
| 1,475,912 A | 11/1923 | Williams |
| 1,514,329 A | 11/1924 | Metcalf |
| 1,537,460 A | 5/1925 | Campbell |
| 1,593,066 A | 7/1926 | Gaston |
| 1,664,636 A | 4/1928 | Mayer |
| 1,837,515 A | 12/1931 | Bachrach |
| 1,936,960 A | 11/1933 | Bowman |
| 2,022,959 A | 12/1935 | Gordon |
| 2,103,553 A | 12/1937 | Reynolds |
| 2,158,801 A | 5/1939 | Petterson |
| 2,336,089 A | 12/1943 | Gould |
| 2,493,303 A | 1/1950 | McCullough |
| 2,544,506 A | 3/1951 | Kronhaus |
| 2,703,134 A | 3/1955 | Mossor |
| 2,749,906 A | 6/1956 | O'Connor |
| 2,758,532 A | 8/1956 | Awe |
| 2,782,834 A | 2/1957 | Vigo |
| 2,791,956 A | 5/1957 | Guest |
| 2,826,135 A | 3/1958 | Benzick |
| 2,931,286 A | 4/1960 | Fry, Sr. |
| 2,976,700 A | 3/1961 | Jackson |
| 2,978,972 A | 4/1961 | Hake |
| 2,992,604 A | 7/1961 | Trotman |
| 2,992,605 A | 7/1961 | Trotman |
| 3,030,145 A | 4/1962 | Kottemann |
| 3,101,037 A | 8/1963 | Taylor |
| 3,101,660 A | 8/1963 | Taylor |
| 3,131,967 A | 5/1964 | Spaulding |
| 3,136,577 A | 6/1964 | Richard |
| 3,137,523 A | 6/1964 | Karner |
| 3,486,177 A | 12/1969 | Marshack |

(List continued on next page.)

FOREIGN PATENT DOCUMENTS

| | | |
|---|---|---|
| DE | 3705756 | 10/1988 |
| DE | 19736951 | 3/1999 |
| DE | 19954978 | 1/2001 |
| EP | 0936105 | 8/1999 |
| FR | 1266925 | 7/1961 |
| FR | 2630056 | 10/1989 |

Primary Examiner—Anthony D. Barfield
(74) Attorney, Agent, or Firm—Foley & Lardner

(57) ABSTRACT

A portable ventilated seat assembly for use by an occupant in a vehicle includes a lay-on pad for supporting the occupant. The pad includes a porous material forming an upper surface layer, a non-porous first inner layer adjacent to the upper surface layer, a non-porous layer forming a lower surface layer and an expanded spacer material between the non-porous layers. The ventilated assembly further includes a fan coupled to the air space between the non-porous layers for ventilating the seat assembly. The ventilated seat assembly allows ventilation and cooling (or reverse flow heating or cooling) for the occupant. The spacer material may have upper and lower netting layers and fibers extending therebetween.

18 Claims, 4 Drawing Sheets

U.S. PATENT DOCUMENTS

| | | |
|---|---|---|
| 3,529,310 A | 9/1970 | Olmo |
| 3,628,829 A | 12/1971 | Heilig |
| 3,681,797 A | 8/1972 | Messner |
| 3,732,944 A | 5/1973 | Kendal |
| 3,736,022 A | 5/1973 | Radke |
| 3,757,366 A | 9/1973 | Sacher |
| 3,778,851 A | 12/1973 | Howorth |
| 3,948,246 A | 4/1976 | Jenkins |
| 4,002,108 A | 1/1977 | Drori |
| 4,043,544 A | 8/1977 | Ismer |
| 4,060,276 A | 11/1977 | Lindsay |
| 4,072,344 A | 2/1978 | Li |
| 4,141,585 A | 2/1979 | Blackman |
| 4,175,297 A | 11/1979 | Robbins |
| 4,391,009 A | 7/1983 | Schild |
| 4,413,857 A | 11/1983 | Hayashi |
| 4,509,792 A | 4/1985 | Wang |
| 4,589,656 A | 5/1986 | Baldwin |
| 4,685,727 A | 8/1987 | Cremer |
| 4,712,832 A | 12/1987 | Antolini |
| 4,729,598 A | 3/1988 | Hess |
| 4,847,933 A | 7/1989 | Bedford |
| 4,853,992 A | 8/1989 | Yu |
| 4,866,800 A | 9/1989 | Bedford |
| 4,923,248 A | 5/1990 | Feher |
| 4,946,220 A | 8/1990 | Wyon et al. |
| 4,981,324 A | 1/1991 | Law |
| 4,997,230 A | 3/1991 | Spitalnick |
| 5,002,336 A | 3/1991 | Feher |
| 5,004,294 A | 4/1991 | Lin |
| 5,016,302 A | 5/1991 | Yu |
| 5,102,189 A | 4/1992 | Saito |
| 5,106,161 A | 4/1992 | Meiller |
| 5,160,517 A | 11/1992 | Hicks |
| 5,211,697 A | 5/1993 | Kienlein |
| 5,226,188 A | 7/1993 | Liou |
| 5,292,577 A | 3/1994 | Van Kerrebrouck |
| 5,335,381 A | 8/1994 | Chang |
| 5,354,117 A | 10/1994 | Danielson |
| 5,356,205 A | 10/1994 | Calvert |
| 5,370,439 A | 12/1994 | Lowe et al. |
| 5,372,402 A | 12/1994 | Kuo |
| 5,382,075 A | 1/1995 | Shih |
| 5,385,382 A | 1/1995 | Single, II |
| 5,403,065 A | 4/1995 | Callerio |
| 5,408,711 A | 4/1995 | McClelland |
| 5,411,318 A | 5/1995 | Law |
| 5,416,935 A | 5/1995 | Nieh |
| 5,561,875 A | 10/1996 | Graebe |
| 5,590,428 A | 1/1997 | Roter |
| 5,597,200 A | 1/1997 | Gregory |
| 5,613,729 A | 3/1997 | Summer, Jr. |
| 5,613,730 A | 3/1997 | Buie |
| 5,626,386 A | 5/1997 | Lush |
| 5,626,387 A | 5/1997 | Yeh |
| 5,645,314 A | 7/1997 | Liou |
| 5,692,952 A | 12/1997 | Chih-Hung |
| 5,715,695 A | 2/1998 | Lord |
| 5,787,534 A | 8/1998 | Hargest |
| 5,833,309 A | 11/1998 | Schmitz |
| 5,833,321 A | 11/1998 | Kim |
| 5,902,014 A | 5/1999 | Dinkel et al. |
| 5,918,930 A | 7/1999 | Kawai |
| 5,921,314 A | 7/1999 | Schuller |
| 5,921,858 A | 7/1999 | Kawai |
| 5,924,766 A | 7/1999 | Esaki |
| 5,924,767 A | 7/1999 | Pietryga |
| 5,927,817 A | 7/1999 | Ekman |
| 5,934,748 A | 8/1999 | Faust |
| 6,003,950 A | 12/1999 | Larsson |
| 6,019,420 A | 2/2000 | Faust |
| 6,059,018 A | 5/2000 | Yoshinori et al. |
| 2001/0035669 A1 | 11/2001 | Anderson et al. |
| 2002/0096915 A1 | 7/2002 | Haupt et al. |
| 2002/0096931 A1 | 7/2002 | White et al. |

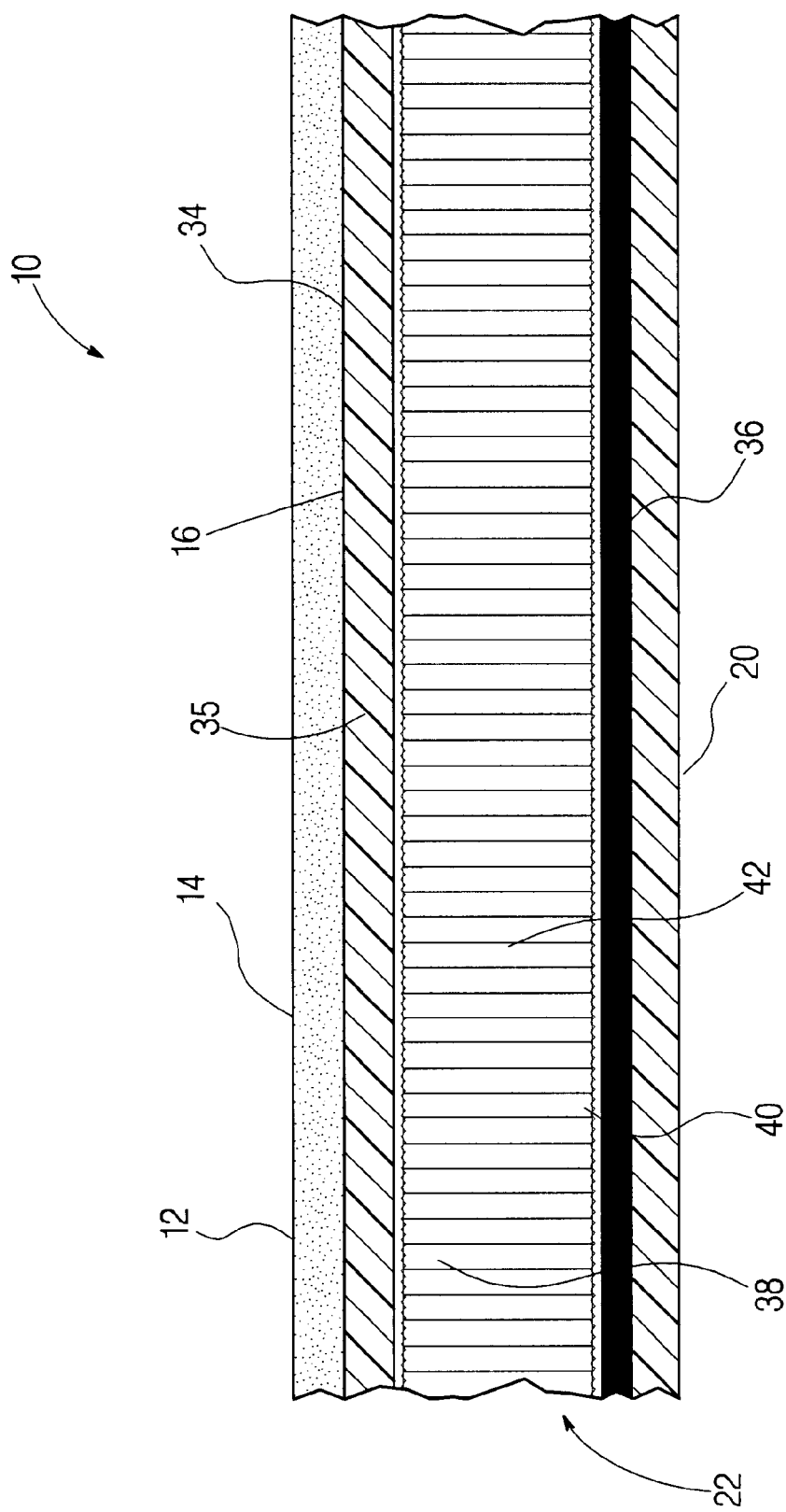

VENTILATED SEAT

FIELD OF THE INVENTION

This invention generally relates to a ventilated seat for a vehicle. More specifically, this invention relates to a portable ventilated seat for a vehicle including a top pad assembly that forms at least a seat cushion, and preferably a seat cushion and seat back, suitable for use with any vehicle seat. Air passes through the seating surface of the pad assembly by suction or forced air flow.

BACKGROUND OF THE INVENTION

When driving a car in hot weather, occupants may experience excessive sweating from contact with the vehicle seat, because the seat prevents or blocks the body's ability to radiate excess heat. To reduce sweating, the occupant may roll down the window of the vehicle, or if provided, turn on the air conditioning to allow cool air to pass through the vehicle interior. A disadvantage of both solutions is that areas of the occupant's body are in contact with the vehicle seat preventing any cooling airflow from reaching those areas. In cold weather, the reverse phenomena may occur, i.e., cold seats may be difficult to warm quickly due to occupant contact with the seat.

Seat covers or pads designed for placement on top of vehicle seats are known. In some cases, these seat covers or pads are made of fashion based materials that allow some air to flow therethrough, thus allowing the occupant to more readily emit heat radiated from the body during hot days or long drives and vice versa in cold weather. These devices have been made from wooden rollers, springs covered with porous sheet material and the like. A disadvantage of these seat covers is that they rely only on passive air flow and thus they do not fully resolve the issues discussed above.

SUMMARY OF THE INVENTION

Accordingly, this invention provides for a portable ventilated seat pad that overcomes the problems and disadvantages discussed above. The invention provides a non-rigid pad assembly for cooling or heating an occupant primarily through evaporative cooling or forced air heating. The invention further provides, in its most preferred embodiment, a range of different air flows, e.g., low/medium/high, by a switch coupled to a fan.

Briefly, the invention is a portable ventilated seat pad assembly that lays on an existing seat in a vehicle. This non-porous pad has an upper surface layer formed of a porous material, a lower surface layer and two inner layers. The first inner layer is preferably formed of a non-porous material which confronts the upper surface. This non-porous layer is provided with ventilation holes for allowing air to flow through the upper surface layer. The second inner layer is a porous material and is positioned between the first inner layer and the lower surface layer. This porous layer is preferably a spring-like cushion having top and bottom netting and an interior consisting of rigidized threads extending between the top and bottom netting.

A fan (vacuum or forced air) is connected to a bag formed by first inner layer and the lower surface layer and air moves through the second inner layer into or out of the ventilation holes provided in the first inner layer and hence through the upper surface layer. A vacuum would draw interior air from the vehicle through the occupant's clothes, through the ventilated seat pad assembly and out through the vacuum device, or the reverse would occur if it were desired to use forced air to heat or cool the air leaving the pad. The pad assembly of the present invention allows the occupant's perspiration to evaporate efficiently from his skin and clothing or to warm or cool the occupant more quickly than has previously been possible. Preferably, the occupant can adjust the airflow rate through the pad to maximize comfort at any time.

BRIEF DESCRIPTION OF THE DRAWINGS

Further features and advantages of the invention will become apparent from the following discussion and accompanying drawings, in which:

FIG. 3 is a side sectional view of the pad of the preferred embodiment;

In the various FIGURES, like reference numerals are used to denote like components.

DETAILED DESCRIPTION OF THE PREFERRED EMBODIMENTS

The following description of the preferred embodiment is merely exemplary in nature and is in no way intended to limit the invention or its application or uses.

Figure 1:
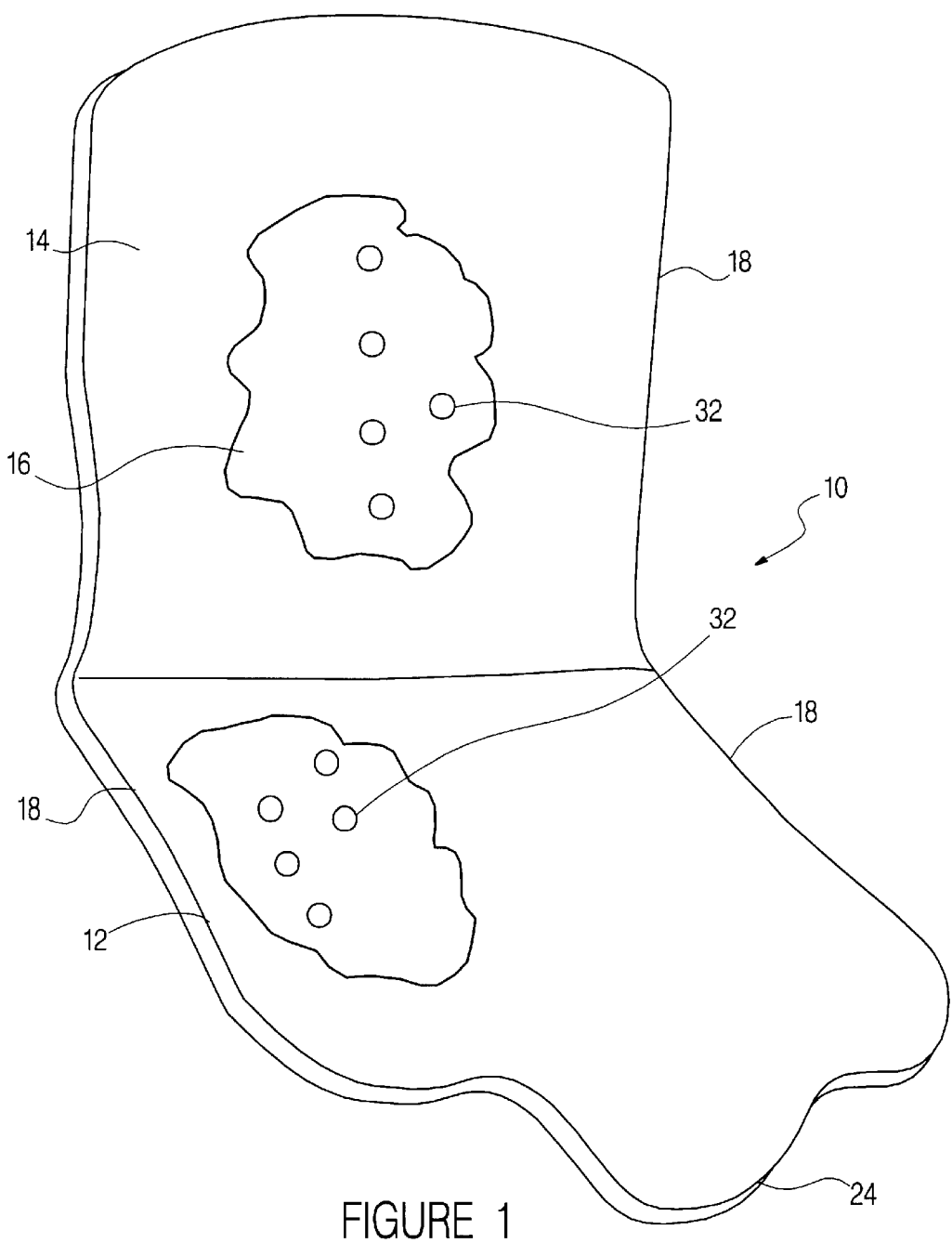
FIG. 1 is a perspective view of the ventilated pad of the preferred embodiment of the invention with a cutaway of the upper surface layer to illustrate a pattern of ventilation holes in the first inner layer.
Figure 4:
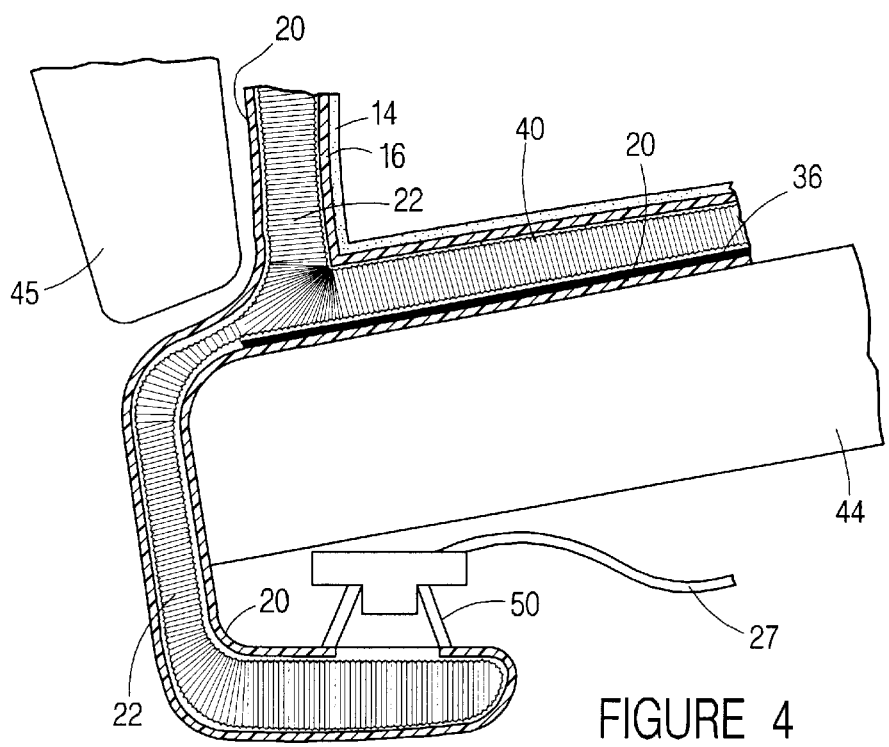
FIG. 4 is a partial cross-sectional view of the ventilated pad showing an alternative location for the fan and fan coupling, i.e., through the seat bite line.

As shown in FIG. 1, the portable ventilated seat pad assembly 10 of the preferred embodiment of the invention includes a pad 12 which lays on top of a vehicle seat 44, 45 (FIG. 4).

Figure 2:
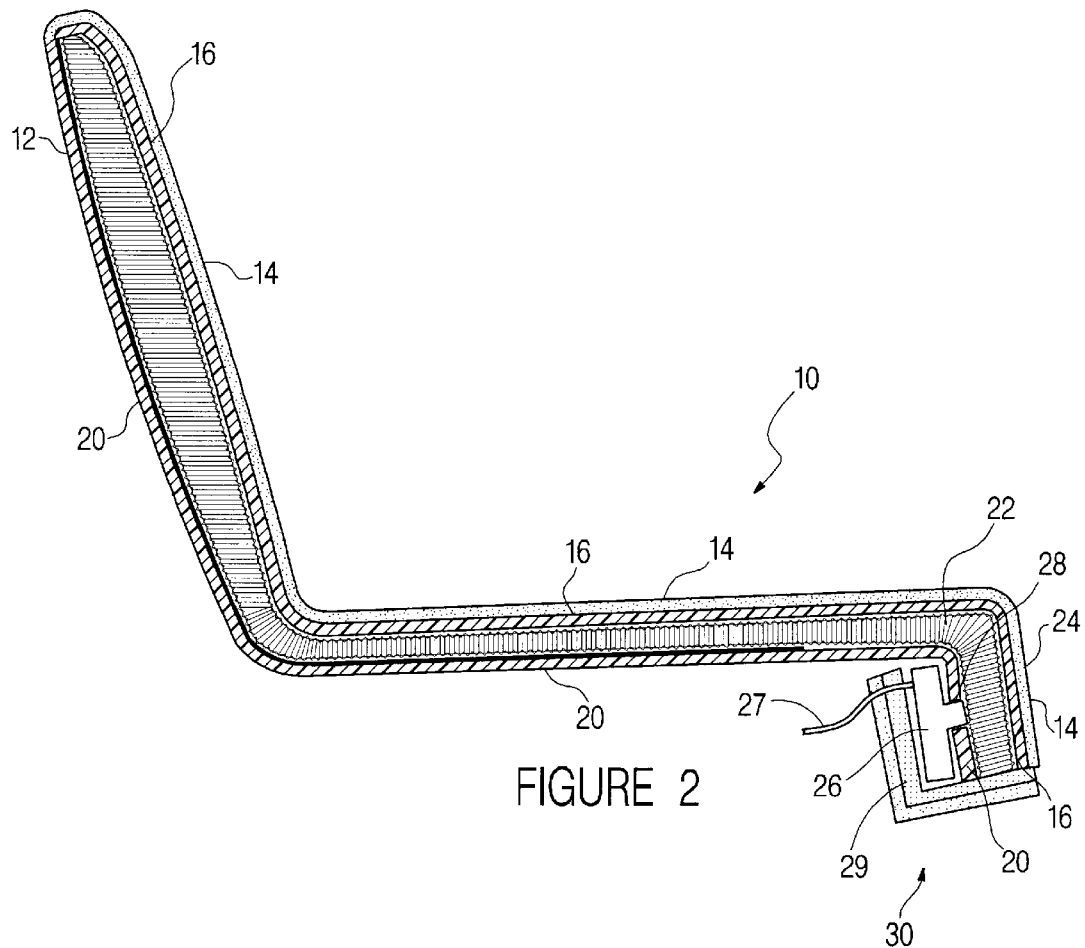
FIG. 2 is a cross-sectional side view of the pad of the preferred embodiment showing by arrows the airflow of the ventilated pad through a fan.

As best shown in FIGS. 2 and 3, the pad 12 includes an upper surface layer 14. The upper surface area 14 is preferably formed of a porous material, e.g., fabric or perforated leather. A first inner layer 16 is formed of a non-porous material, as is a lower surface layer 20. Upper surface layer 14, first inner layer 16, and lower surface layer 20 are attached, for example, by sewing 18 (FIG. 1), forming an air impermeable bag between the first inner layer 16 and the lower surface layer 20.

Figure 2A:
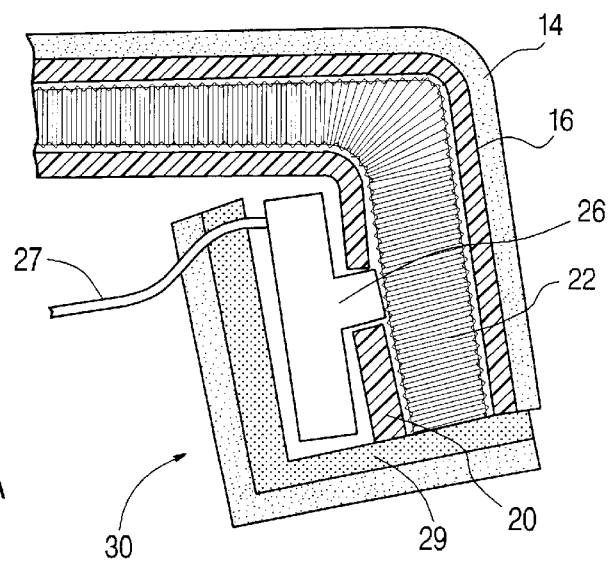
FIG. 2A is an exploded view of the fan area of FIG. 2 and illustrating a noise reduction layer about the fan.

An expanded, porous second inner layer 22 is located between non-porous layers 16, 20 and is preferably 5900 series spacer fabric available from Mueller Textil located at Wiehl, Germany. It will be described in greater detail in connection with FIGS. 2, 2A and 3. Extending forwardly from the pad 12, is tongue 24 (FIGS. 1 and 2) coupled to a fan 26 powered by wire 27. The fan 26 is coupled to the air space within layer 22. FIGS. 2 and 2A show fan 26 coupled to an opening 28 in layer 20. Tongue 24 can form a pocket-like structure 30 to support fan 26. In the illustrated embodiment, a layer of any suitable sound-absorbing material 29 surrounds fan 26.

Figure 5:
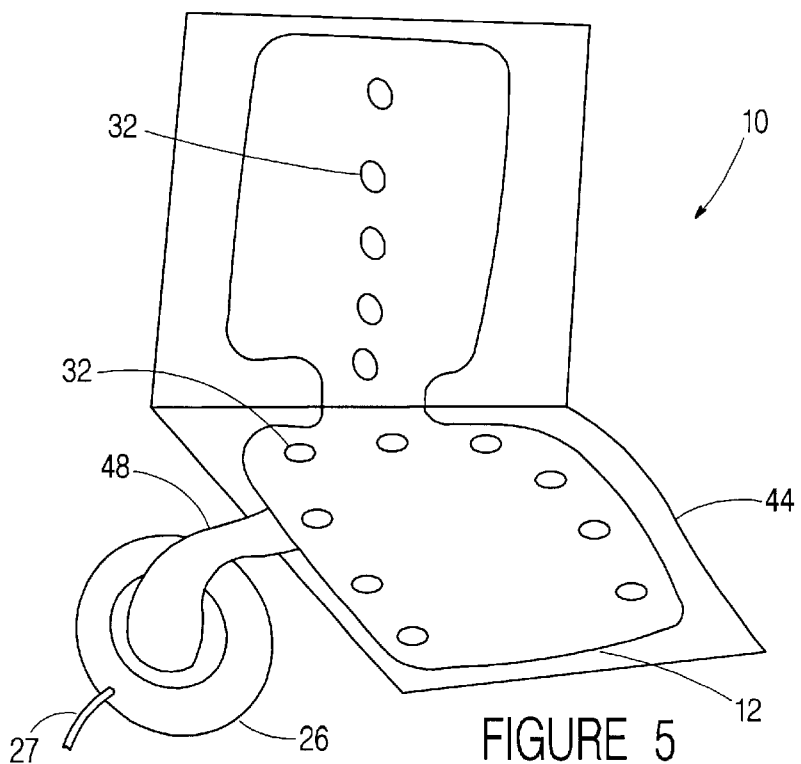
FIG. 5 is a perspective view of a ventilated pad arrangement showing a side connection of the fan, e.g., between an inboard bolster and center console of a vehicle.

With reference to FIGS. 1, 3 and 5, ventilation holes 32 are provided in first inner layer 16. Ventilation holes 32 are preferably positioned in a U-shape along the lower half of pad 12 to provide airflow about the thighs and seat of the occupant sitting on the pad 12. Ventilation holes 32 provided in the upper seating area of the pad 12 are linear to provide good suction or forced airflow to assist in the elimination or reduction of sweating of the occupant's back. In a preferred embodiment, non-porous material 16 is formed of a laminated continuous resin-film layer 34 to a foam layer 35, wherein the continuous layer 34 provides support about ventilation holes 32, thereby preventing tearing of them when the occupant sits on pad 12.

Lower surface layer 20 may be provided with a tacky interior layer 36 (e.g. an adhesive) for fixing the position of the porous material 22 between layers 16 and 20 and preventing slipping thereof while allowing airflow through the pad 12. Alternatively, the porous material 22 can be stitched to either or both of layers 16 and 20.

The porous material 22 is preferably formed of a spacer fabric (as described above). This spacer fabric has an upper layer of netting 38 and a lower layer of netting 40 supported by a middle layer comprised of plurality of semi-rigid threads 42. Threads 42 extend between upper netting 38 and lower netting 40. The porous material 22 is strong enough to provide a cushion for the occupant while ensuring airflow in all directions, i.e., laterally and longitudinally as well as perpendicular to the netting layers 38 and 40, even when the seat is occupied.

With reference to FIGS. 2, 4, and 5, fan 26 is shown attached to the pad 12 in several different locations. In one preferred embodiment, as shown in FIG. 2, the fan 26 is located in the tongue 24 extending between the occupant's legs. Other embodiments, as shown in FIGS. 4 and 5, show fan 26 under or to the side of a lower seat cushion 44. Specifically, FIG. 4 shows a vehicle seat cushion 44 and a seat back 45 provided with pad 12. Attachment of the fan 26 to the pad 12 is through the bite line of the seat in FIG. 4 and between an inboard bolster (not shown) and a center console (not shown) in FIG. 5. A quick connect for electrical wiring 27 to the fan 26 may be provided. Fan 26 may, for example, be powered by plugging wire 27 into a conventional cigarette lighter provided in vehicles or the wire 27 may be hard wired to the vehicle electrical system.

As best shown in FIGS. 1–3, the vehicle seat pad assembly 10 of the present invention pulls cabin air of the vehicle through the occupant's clothes and porous upper surface layer 14 when the fan is activated in a suction made. Ventilation holes 32 provide patterned openings for pulling the air away from upper surface layer 14 through the first inner layer 16. Air then passes through the spacer material 22. Lower surface area 20 (or upper layer 16 or both) seals about the entrance to fan 26.

The coupling to fan 26 may include a separate non-air permeable seal 50, which in turn is coupled to one or both of the air impermeable layers.

As fan 26 draws air away from the occupant or forces air into pad 12, air speed may be controlled by any suitable fan speed switch, e.g., at high, medium or low speeds.

The foregoing discussion describes preferred and alternate embodiments of the invention. One skilled in the art will readily recognize from such discussion and from the accompanying drawings and claims that changes and modifications can be made to the invention without departing from the true spirit and fair scope of the invention.

What is claimed is:

1. A ventilated seat pad assembly for cooling or heating an occupant's back, seat and thighs, the assembly comprising:

a lay-on pad for being placed on a vehicle seat comprising:

an upper section configured to support the occupant's back, and a lower section configured to support the occupant's seat and thighs, the lower section having a first end connected to the upper section and a second end distal the upper section;

a porous upper surface layer;

a non-porous first inner layer adjacent to said upper surface layer;

a non-porous lower surface layer;

an expanded spacer layer between said non-porous layers and extending through both the upper section and the lower section;

a tacky layer between said expanded spacer layer and said lower surface layer, wherein said tacky layer prevents movement of said expanded spacer layer relative to said lower surface layer;

ventilation holes in the first inner layer; and a fan coupled to the air space within the expanded spacer material proximate the second end of the lower section, and configured to circulate air within both the upper and lower sections.

2. The ventilated seat pad assembly of claim 1, wherein the fan is arranged to draw air through the ventilation holes and out from the air space within the expanded spacer layer.

3. The ventilated seat pad assembly of claim 2, wherein said first inner layer includes a pattern of ventilation holes.

4. The ventilated seat pad assembly of claim 1, wherein said first inner layer includes a continuous resin film layer.

5. The ventilated seat pad assembly of claim 1, wherein said first inner layer comprises a foam layer laminated to a continuous resin film layer.

6. The ventilated seat pad assembly of claim 1, further comprising a tongue extending from the pad, the tongue at least partially enclosing said fan, the fan having an inlet coupled to a non-porous layer.

7. The ventilated seat pad assembly of claim 1, wherein said fan comprises a portable, electrically powered fan having multiple speeds.

8. A ventilated seat pad assembly comprising:

a lay-on pad for supporting a user comprising:

a porous upper surface layer;

a non-porous material forming a first inner layer and being adjacent the upper surface layer and having ventilation holes therein;

a non-porous material forming a lower surface layer;

an expanded spacer material between said non-porous layers, said expanded spacer material formed of spacer fabric having an upper and a lower layer of netting and a middle layer of threads extending between said upper and lower netting layers;

a tacky layer between said expanded spacer material and said lower surface layer, wherein said tacky layer prevents movement of said expanded spacer material relative to said lower surface layer; and a fan attached to an opening in at least one of the non-porous layers;

wherein the ventilation holes in the first inner layer are for directing air toward or away from said upper surface layer through the expanded spacer material.

9. The ventilated seat pad assembly of claim 8, wherein said first inner layer comprises ventilated holes in a pattern conforming to an occupant's contact area.

10. The ventilated seat pad assembly of claim 8, wherein said first inner layer includes a continuous resin film layer.

11. The ventilated seat pad assembly of claim 8, wherein said first inner layer includes a foam layer laminated to a continuous resin film layer.

12. The ventilated seat pad assembly of claim 8, wherein a tongue extends from the pad and the fan is coupled to the tongue to permit the fan to be located at a location spaced apart from the pad.

13. The ventilated seat pad assembly of claim 8, wherein the fan is a multi-speed fan.

14. A ventilated seat pad assembly including a pad on the seat and the backrest of a vehicle seat, the pad comprising:
- a porous outer surface layer;
- a non-porous first inner layer adjacent to said outer surface layer and including a plurality of ventilated holes;
- a non-porous material forming an inner surface layer;
- an expanded spacer material between said non-porous layers, the expanded spacer material being formed of spacer fabric having an upper and a lower layer of netting and a middle layer of threads extending between said upper and lower netting layers;
- a tacky layer between said expanded spacer material and said inner surface layer, wherein said tacky layer prevents movement of said expanded spacer material relative to said inner surface layer; and
- a fan operatively coupled to an opening in said inner surface layer for forcing air through or drawing air from the ventilation holes in the first inner layer through the expanded spacer material.

15. The ventilated seat pad assembly of claim 14, wherein said non-porous layer adjacent to said outer surface layer comprises a foam layer laminated to a continuous resin film layer.

16. A ventilated seat pad comprising:
- a porous outer surface layer;
- a non-porous material including
  - a first inner layer adjacent to said outer surface layer and including a plurality of ventilated holes; and
  - a lower surface layer;
- an expanded spacer material between said layers of said non-porous material, the expanded spacer material being formed of spacer fabric having an upper and a lower layer of netting and a middle layer of threads extending between said upper and lower netting layers;
- a tacky layer between the expanded spacer material and a portion of the non-porous material, wherein said tacky layer prevents movement of the expanded spacer material relative to said non-porous material; and
- a fan operatively coupled to an opening in said non-porous material for forcing air through or drawing air from the ventilation holes in the first inner layer through the expanded spacer material.

17. The ventilated seat pad of claim 16 wherein said tacky layer is between said expanded spacer material and said lower surface layer.

18. The ventilated seat pad of claim 16 wherein said first inner layer comprises a foam layer laminated to a continuous resin film layer.

* * * * *